US012356220B2

(12) United States Patent
Chang et al.

(10) Patent No.: US 12,356,220 B2
(45) Date of Patent: Jul. 8, 2025

(54) TELECOMMUNICATIONS NETWORK PREDICTIONS BASED ON MACHINE LEARNING USING AGGREGATED NETWORK KEY PERFORMANCE INDICATORS

(71) Applicant: T-Mobile Innovations LLC, Overland Park, KS (US)

(72) Inventors: Hui-Lin Chang, Brambleton, VA (US); Lance Paul Lukens, Templeton, CA (US); Shawn Derek Wallace, Charles Town, WV (US); Farhana Sharmin Munnee, Herndon, VA (US); Daqi Li, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 821 days.

(21) Appl. No.: 17/565,126

(22) Filed: Dec. 29, 2021

(65) Prior Publication Data

US 2023/0209367 A1    Jun. 29, 2023

(51) Int. Cl.
 *H04W 24/02* (2009.01)
 *G06N 20/00* (2019.01)
(52) U.S. Cl.
 CPC ............ *H04W 24/02* (2013.01); *G06N 20/00* (2019.01)
(58) Field of Classification Search
 CPC .......... G06N 20/00; G06N 5/025; G06N 7/01; H04W 16/22; H04W 16/18; H04W 24/02; H04W 24/08; H04W 28/02; H04W 72/542; H04L 41/145; H04L 41/16; H04L 41/142; H04L 41/147; H04L 41/5067; G06Q 10/06393
 See application file for complete search history.

(56) References Cited

U.S. PATENT DOCUMENTS 8,209,218 B1 *  6/2012  Basu ................. G06Q 10/0637
                                                    705/7.38
9,439,081 B1 *  9/2016  Knebl .................... G06N 20/00
(Continued)

FOREIGN PATENT DOCUMENTS

CN            113169887 B  *  7/2023  ............. H04B 17/15
WO     WO-2020064134 A1  *  4/2020  ............. H04B 17/15

*Primary Examiner* — Matthew C Sams
(74) *Attorney, Agent, or Firm* — Shook, Hardy & Bacon L.L.P.

(57) ABSTRACT

Systems and methods for making telecommunication network predictions on a granular geographic area-scale. The method can include receiving network key performance indicators (KPIs) associated with a plurality of user equipment (UEs) and then parsing the network KPIs into a plurality of geographic area-based categories corresponding to network KPIs obtained by cell towers or UEs located within a given geographic area, like a zip code. The method can further include combining the geographic area-based categories into clusters determined based on one or more similarities in the network KPIs of each, and predicting a most-influential one of the network KPIs within at least one of the clusters via a machine learning (ML) model. In response, the method can then cause an indicator to be generated at a user interface, the indicator indicating the most-influential one of the network KPIs within the at least one of the clusters.

20 Claims, 8 Drawing Sheets

(56) References Cited

U.S. PATENT DOCUMENTS

| | | | |
|---|---|---|---|
| 2004/0259555 A1* | 12/2004 | Rappaport | H04W 16/18 |
| | | | 455/446 |
| 2013/0329588 A1* | 12/2013 | Sangwan | H04W 24/02 |
| | | | 370/252 |
| 2013/0331109 A1* | 12/2013 | Dhillon | H04W 24/02 |
| | | | 455/446 |
| 2017/0364819 A1* | 12/2017 | Yang | H04L 41/16 |
| 2018/0270126 A1* | 9/2018 | Tapia | H04L 43/065 |
| 2019/0166606 A1* | 5/2019 | Kalderen | H04W 24/02 |
| 2020/0092019 A1* | 3/2020 | Wang | H04W 4/33 |
| 2023/0034994 A1* | 2/2023 | Li | G06N 20/00 |
| 2023/0209367 A1* | 6/2023 | Chang | G06N 5/01 |
| | | | 455/423 |

* cited by examiner

TELECOMMUNICATIONS NETWORK PREDICTIONS BASED ON MACHINE LEARNING USING AGGREGATED NETWORK KEY PERFORMANCE INDICATORS

BACKGROUND

Current telecommunications networks report and track various key performance indicators (KPIs) for a particular spectrum allocation scheme area, such as a Major Trading Area (MTA), or a metropolitan statistical area, which is only slightly smaller than telecommunications markets. Telecommunications markets are generally quite large and can encompass numerous zip codes, such as a city and all of its surrounding suburbs. However, customer network experiences can be centralized in smaller areas, like individual zip codes within a large market. In some instances, current telecommunications market level tracking is not granular enough to provide adequate indications of local area network issues for network improvements and meet local customer satisfaction goals.

SUMMARY

Embodiments of the present disclosure relate to making predictions that will optimize network performance and/or customer experience ratings at a specific geographic area-based level of granularity (e.g., a zip code-level of granularity). Specifically, systems and methods are disclosed that may be used to train a machine learning (ML) model to predict most influential key performance indicators (KPI)s that a network operator may then use to predict how different actions may result in improved network performance, improved customer experience/satisfaction, and/or improved customer acquisition, or the like.

In contrast to conventional technologies, disclosed approaches may apply KPIs to an ML model(s) at a small geographic area of granularity, such as a postal zip-code level granularity. For example, in one embodiment, a computer-implemented method can include the step of receiving network KPIs related to a plurality of user equipment (UEs). Next, the method can include parsing the network KPIs into a plurality of geographic area-based categories. Each one of the plurality of geographic area-based categories may correspond to network KPIs obtained by cell towers or UEs located within a given geographic area, such as within a given postal zip code. Furthermore, the method can include a step of combining various ones of the geographic area-based categories into clusters determined based on one or more similarities in the network KPIs of each of the geographic area-base categories. The method can also include a step of predicting items based on the network KPIs in different ones of the clusters, such as predicting a most-influential one of the network KPIs within at least one of the clusters. This predicting step can be performed by applying a ML model to the network KPIs of the at least one of the clusters. Finally, in response to the predicting step, the method can include causing an indicator to be generated on a user interface. The indicator may indicate the prediction (e.g., the predicted most-influential one of the network KPIs) within the at least one of the clusters (e.g., indicator may be color-coded postal zip codes on a map).

BRIEF DESCRIPTION OF THE DRAWINGS

The present systems and methods for machine learning of encoding parameter values for a network using a video encoder is described in detail below with reference to the attached drawing figures, wherein.

DETAILED DESCRIPTION

Figure 1:
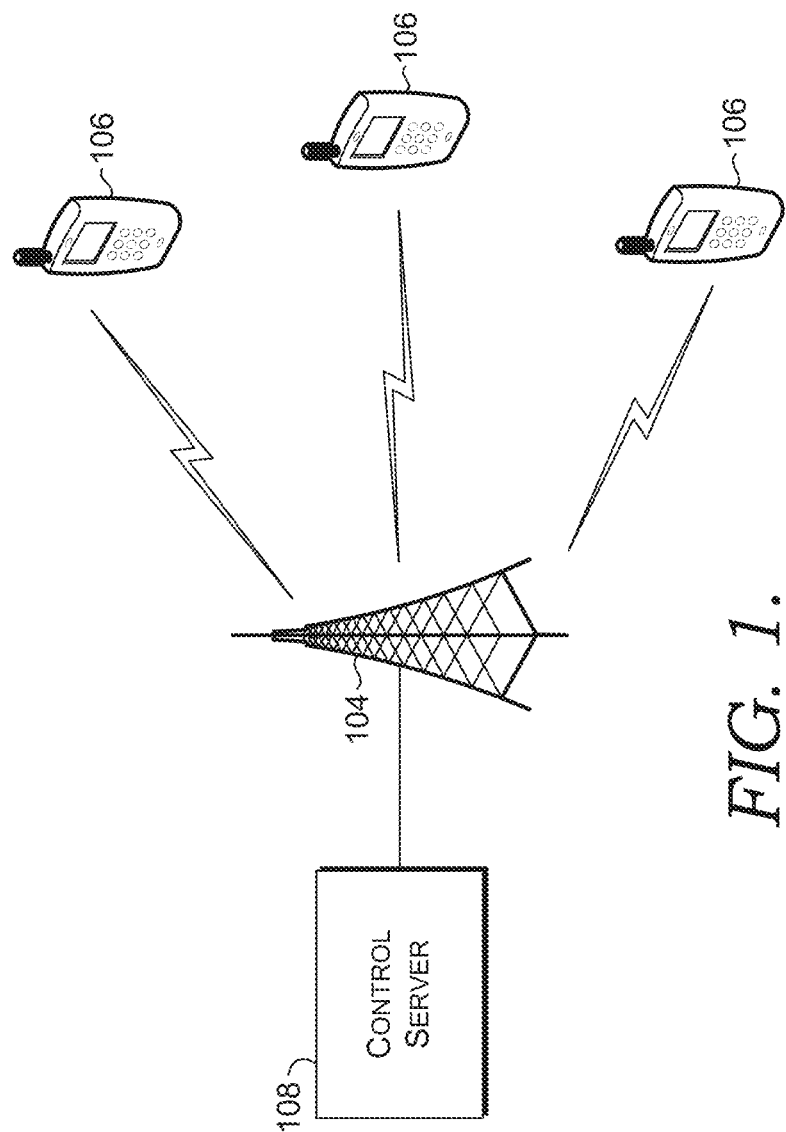
FIG. 1 depicts a diagram of an exemplary system suitable for use in implementations of the present disclosure, sharing data in accordance with aspects herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of this technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the goal tracking and network reporting by existing technologies, such as existing telecommunications networks, are mostly done at existing spectrum allocation scheme areas or markets, such as MTA. MTA typically refers to a geographic area comprising of a large city or grouping of cites with similar geographical characteristics. Specifically, MTA is FCC's geographic spectrum allocation scheme. The history of markets assignments (non-standard) within wireless have evolved from MTA FCC spectrum allocations and require local network resources to manage and maintain spectrum deployments. However, customer network experiences are more likely centralized in smaller geographic areas, such as postal zip codes in the United States (or similar geographic areas in other nations). Current market level goal tracking is not granular enough to provide directions of local area network improvements and meet local customer satisfaction goals. However, tracking smaller regions can be time- and resource-intensive.

Moreover, the functionality of these existing technologies is limited and requires tedious manual user input. For example, in order to report network conditions and track attributes associated with a telecommunications network, some technologies, such as electronic spreadsheets and database management systems, are configured to receive repetitive manual user input that defines various KPS, such as demographics of customers and marketing data. Then, upon another manual user request, these technologies can perform simplified statistical functionality (e.g., SUM, AVERAGE, MAX, MIN, MODE, etc.). For example, electronic spreadsheet technologies can find the demographic attributes that are the most prevalent in a market level. However, these technologies fail to make intelligent predictions associated with the KPI data, such as predicting a most-influential one of the network KPIs by applying a machine learning (ML) model to the network KPIs.

Existing technologies also unnecessarily consume computing resources (e.g., I/O, CPU, etc.) as a result of this limited functionality and these manual user input requirements. For example, because these technologies fail to make these intelligent predictions, such as predicting signal quality or average throughput for a given area, the actual signal quality or throughput of telecommunications networks in the given area will be reduced. Further, each manual user input may require an I/O operation (e.g., a READ or WRITE) to disk, which is expensive due to the mechanical movements of a read/write head to locate the data. Accordingly, because there are multiple manual user inputs with these existing technologies, there are multiple I/Os, which increase computing latency and wears on the read-write head.

Further, repetitive manual user input with respect to existing database management systems unnecessarily consumes computing resources. Existing database management systems require queries to be repetitively issued to indicate KPIs of telecommunications networks and perform various functionality. However, processing queries for KPI processing consumes a lot of computing resources. For example, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time. Most database relations contain hundreds if not thousands of records. Repetitively calculating query execution plans on this quantity of rows decreases throughput and increases network latency.

Particular embodiments of the present disclosure are directed to providing one or more technical solutions to these technical problems (and others) and improving these existing technologies by optimizing a telecommunications network for improved customer experience ratings or other such network improvements within one or more geographic areas (e.g., postal zip codes). More specifically, aspects of the current disclosure relates to techniques and approaches for training and deploying one or more Machine Learning (ML) models to predict, on a small geographic area-based level of granularity, how key performance indicators (KPIs) influence customer experiences, customer acquisition, loss of customers, and the like. Additionally or alternatively, the ML models or the data obtained thereby can be used to predict network improvements (or categories of network improvements) that will improve customer experience ratings for a particular geographic area (e.g., postal zip code) or clusters of geographic areas. For example, in some embodiments, this network improvements prediction can be based on a predicted most-influential network key performance indicator (KPI) associated with that geographic area or the cluster to which that geographic area belongs.

Specifically, in some embodiments, a computer-implemented method can include receiving network KPIs related to a plurality of user equipment (UEs) and parsing the network KPIs into a plurality of geographic area-based categories. Each one of the plurality of geographic area-based categories may correspond to network KPIs obtained by cell towers or Ues located within a given geographic area (e.g., within a given postal zip code). The network KPIs can include, for example, one or more of the following: signal quality, latency, dropped calls, average throughput of usage, lack of coverage, how often the Ues have a signal lower than a defined threshold, percentage of low coverage, home coverage signal strength, latency, leakage (amount of time spent on lower technologies (e.g., 4G instead of 5G), DIPs (percentage of secondary DNS retries), and voice drops (e.g., quantity of voice drops)).

Furthermore, the method can include combining geographic area-based categories into clusters determined based on one or more similarities in the network KPIs of each of the geographic area-base categories, and making a prediction based on the network KPIs (e.g., a most-influential one of the network KPIs within at least one of the clusters). This predicting can be performed by applying a ML model to the network KPIs of the at least one of the clusters. Finally, in response to the predicting, the method can include causing an indicator to be generated on a user interface. For example, the indicator may indicate the most-influential one of the network KPIs within the at least one of the clusters (e.g., indicator may be color-coded postal zip codes on a map).

In some embodiments, the ML model is configured to predict ones of the network KPIs that most influence customer experience scores such as NEX3.9 scores or the like for each of the clusters. Additionally or alternatively, the ML model can be configured to predict ones of the network KPIs that most influence customer dissatisfaction metrics or customer acquisition propensity for each of the clusters. Furthermore, combining the geographic area-based categories into clusters can be achieved using a k-means cluster algorithm based on one or more of the network KPIs. However, other clustering algorithms or methods can be used without departing from the scope of the technology described herein.

In some embodiments, the computer-implemented method can comprise training the ML model using one or more the following: network KPIs, customer data, marketing data, demographic data, churn data, calls to care data, customer survey data, and customer complaint data. The computer-implemented method can also comprise weighting various ones of the network KPIs within each of the clusters based on which of the network KPIs are identified as being most influential within each of the clusters, and then tuning the ML model based on the weighting of the various ones of the network KPIs. In some embodiments, the computer-implemented method can also include generating a map with visual indications for each of a plurality of geographic areas depicted on the map, such as postal zip codes depicted thereon. The visual indications can denote which of the network KPIs are most influential within associated ones of the clusters to which each of the plurality of geographic areas belongs (e.g., indicator may be color-coded postal zip codes on a map).

Combining the data for the various geographic area-based categories into clusters can be performed in a number of ways and may be clustered in accordance to similarities other than geographic proximity. For example, to form such clusters based on one or more of the network KPIs, the system and/or methods herein can utilize one or more clustering models, for example, k-means clustering model, hierarchical clustering model, x means clustering model, distribution based clustering model or density based clustering model, and the like to generate these clusters of shipping units. Additionally or alternatively, the clustering can be based on various non-geographic similarities, such as population demographics, population density, how urban or rural the areas are, geographic features of the areas that can affect signal quality (e.g., mountains versus plains), whether the areas have similar network resources, and the like.

In some embodiments, the k-means clustering model creating the clusters described herein operates by partitioning the geographic area-based categories extracted into k clusters. The number of k is calculated via various techniques, such as where finding the number of k is via the elbow method, which operates by looking at the percentage of variance as a function of the number of clusters, then choose a number of clusters where adding another cluster does not produce a better model of the underlying data. The basis for judging the quality of the model can be manual observation in some embodiments. Additionally, silhouette method can be used to check if the suggested object (or geographic area, e.g., zip code) lay within a cluster by measuring the grouping of the objects in the cluster, where the lower number is better for clustering. Once the k value is determined using elbow method a simple cross-validation method can be used to verify if the suggested k value is correct.

After defining k clusters, the model can assign each geographic area-based category extracted to the cluster which has the closest mean (e.g., based on the network KPIs of each of the geographic area-based categories). The initial set of means can be generated randomly or based on other algorithms. In some embodiments, a centroid like model can be used to get clusters. A trinary chart (or other such clustering charts or scatter plots) can be created to visualize the clusters to cross check the clustering assignments. A trinary chart graphically represents ratios or percentages of three variables in an equilateral triangle that sum to a constant. The three variables represent 3 different clusters, where each data point is plotted within the trinary chart to indicate the proportion of cluster(s) it belongs to. When using features having a quantitative value such as features representing network KPIs associated with particular scores, percentages, latency, capacity, signal strength, and the like, the closest cluster is often the cluster where the difference between the quantitative values defining the cluster is the smallest. For features comprising qualitative data, such as various categorizations, one can assign a quantitative value to the qualitative value. The assignments can be adjusted based on the user's needs. When using features having a qualitative value, the closest cluster is often the cluster where the cardinality (quantity of elements in a set) difference between set elements is the smallest.

After the features are assigned into clusters, the k-means based clustering model can also calculate the new means for the different clusters by calculating the means of the various features in the clusters. After the new means are calculated, the assignments of the geographic area-based categories (e.g., zip codes) to clusters will be updated. The process of updating assignments and calculating means may keep repeating itself for a pre-determined number of rounds or until an update process does not change any of the assignments. In some embodiments, after the process stops, the k-means based clustering model may output the clusters and features for processing and input into one of the other ML models described herein.

A "machine learning model," "neural network," or "learning model" as described herein (such as the ML models described herein) refers to a model that is used for machine learning tasks or operations. A machine learning model can comprise a title and encompass one or more input data, target variables, layers, classifiers, etc. In various embodiments, a machine learning model can receive an input (e.g., network KPIs, customer data, marketing data, demographic data, churn data, calls to customer care data, survey data, customer complaint data), identify patterns or associations in the input in order to predict a given output (e.g., customer experience score, customer acquisition propensity, customer dissatisfaction metric) and make predictions based on the output (e.g., network solutions, categories of solutions, etc.). Machine learning models can be or include any suitable model, such as one or more: k-means clustering model, neural networks, word2Vec models, Bayesian networks, Random Forests, Boosted Trees, etc. "Machine learning" as described herein, in particular embodiments, corresponds to algorithms that parse or extract features of input data (e.g., network KPIs, customer data, marketing data, demographic data, churn data, calls to customer care data, survey data, customer complaint data), learn (e.g., via training) about the historical data by making observations or identifying patterns in data, and then receive a subsequent input (e.g., network KPIs of a cluster) in order to make a determination, prediction, and/or classification of the subsequent input based on the learning without relying on rules-based programming (e.g., conditional statement rules). The ML models disclosed herein can be or can include, for example, a regressor ML model, a classification ML model, a clustering ML model, a classifier, or any other ML models known in the art for machine learning modeling to make predictions based on the KPIs of each geographic-based area or cluster, as described herein. More explanation regarding ML models and neural networks is provided below and depicted in FIG. 8.

Various aspects of the present disclosure improve the functionality of existing technologies. Instead of goal tracking and network reporting at market level, which existing telecommunications networks are configured to do, various embodiments make predictions at smaller geographic areas, such as postal zip codes. In other words, the goal tracking and network reporting is granular enough to provide directions of local area network improvements and meet local customer satisfaction and other goals. Moreover, unlike existing telecommunications networks, electronic spreadsheets, database management systems, and other technologies, particular embodiments make intelligent predictions associated with the KPI data, such as predicting a most-influential one of the network KPIs by applying a machine learning (ML) model to the network KPIs. Further, various aspects of the present disclosure do not require tedious manual user input in order to report network conditions and track attributes associated with a telecommunications network. Rather, various aspects perform automated functionality, such as automatically predicting a most-influential one of the network KPIs by applying a machine learning (ML) model to the network KPIs based unique criteria or rules, such as parsing the network KPIs into a plurality of geographic area-based categories, where each one of the plurality of geographic area-based categories corresponds to network KPIs obtained by cell towers or Ues located within a given geographic area. Other such rules or criteria can include combining the geographic area-based categories into clusters determined based on one or more similarities in the network KPIs of each of the geographic area-based categories, as described in more detail herein.

Various aspects of the present disclosure also improve the functioning of computers and computing resource consumption. For example, particular embodiments make intelligent predictions, such as predicting signal quality or average throughput for a given area. Accordingly, the actual signal quality or throughput of telecommunications networks in the given area will be reduced because these issues are remedied based on these predictions. Further, various embodiments reduce disk I/O because they reduce the amount of manual user input via automated functionality (e.g., predictions of a most influential KPI). Accordingly, some embodiments reduce the mechanical movements of a read/write head to locate the data. Accordingly, because there are fewer manual user inputs, there are fewer I/Os, which decreases computing latency and there is less wear on the read-write head.

Further, because there is less repetitive manual user input with respect to existing database management systems, there is improved latency. As described above, existing database management systems require users to repetitively issue queries to indicate KPIs of telecommunications networks and perform various functionality. However, various aspects to not require repetitively issued queries to indicate KPIs. Accordingly, an optimizer engine of a database manager module calculates query execution plans on fewer queries. This increases throughput and decreases network latency.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes at least one control server 102, one or more communication components 104, and a plurality of user equipment (Ues) 106. The control server 102 can comprise any one or more processors, communication components, memory storage, and the like. In network environment 100, the plurality of Ues 106 may take on a variety of forms, such as internet-of-things (IoT) devices, a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 600) that communicates via wired or wireless communications with the control server 102 and/or the one/or more communication components 104 in order to interact with a public or private network. IoT devices can comprise nonstandard electronic devices or computing devices that communicably connect to a network (directly or wirelessly) and have the ability to transmit data. For example, IoT devices can include internet-connected home appliances such as an oven, refrigerator, washer, dryer, dishwasher, or the like, as well as thermostats, automated vacuum devices, home security sensors, and the like. However, in some embodiments, the Ues are wireless telecommunication electronic devices such as smart phones, smart watches, electronic tablets, GPS devices, or the like that are communicably coupled to a telecommunications network.

Figure 8:
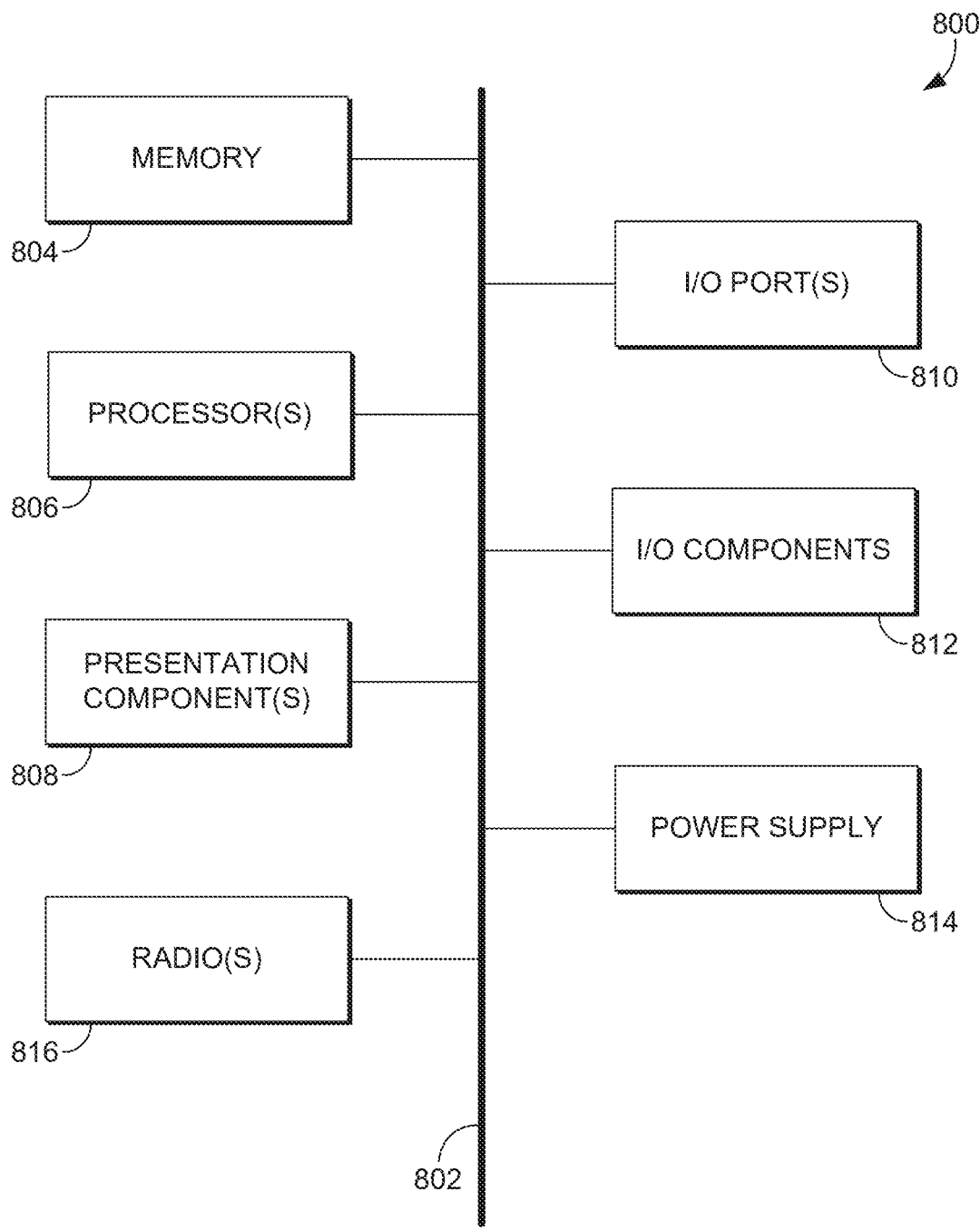
FIG. 8 is a block diagram of an example computing device(s) suitable for use in implementing some embodiments of the present disclosure.

In some aspects, the control server 102 and/or the Ues 106 may correspond to computing device 800 in FIG. 8. Thus, the control server 102 and/or the plurality of Ues 106 can include, for example, a display(s), a power source(s) (e.g., a battery), a data store(s), a speaker(s), memory, a buffer(s), a radio(s) and the like. In some implementations, the control server 102 and/or the Ues 106 comprise a wireless or mobile device with which a wireless telecommunication network(s) can be utilized for communication (e.g., voice and/or data communication). In this regard, the Ues 106 can be any mobile computing device or IoT device that communicates by way of Wi-Fi, Bluetooth, or a wireless network such as a 3G, 4G, 5G, LTE, CDMA, or any other type of network.

In some cases, the control server 102 and/or the Ues 106 in the network environment 100 can optionally utilize a network to communicate with other computing devices (e.g., a mobile device(s), a server(s), a personal computer(s), etc.). The network may be a telecommunications network(s), or a portion thereof. A telecommunications network might include an array of devices or components (e.g., one or more base stations). Those devices or components may form network environments similar to what is shown in FIG. 1, and may also perform methods in accordance with the present disclosure. The network can include multiple networks, as well as being a network of networks (such as a home network of devices with one or more devices connected to another larger communication network), but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices. For example, the network may provide voice and non-voice services, including SMS, and/or data services to user devices or corresponding users that are registered or subscribed to utilize the services provided by a telecommunications provider. The network can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the one or more communication components 104 are configured to communicate with user devices, such as the Ues 106 that are located within the geographical area, or cell, covered by the one or more antennas or other such communication components. The one or more communication components 104 may include one or more base stations, nodes, base transmitter stations, radios, antennas, antenna arrays, power amplifiers, transmitters/receivers, digital signal processors, control electronics, GPS equipment, and the like. In particular, the control server 102 and/or the Ues 106 may communicate with the one or more communication components 104, according to any one or more of a variety of communication protocols, in order to access the network.

In some aspects, the control server 102 can comprise a communication component, a processor and one or more non-transitory computer storage devices storing computer-usable instructions that cause the processor to perform one or more of the methods described herein. These and other control server components can include, for example, any components of the computing device 800 of FIG. 8.

Figure 2:
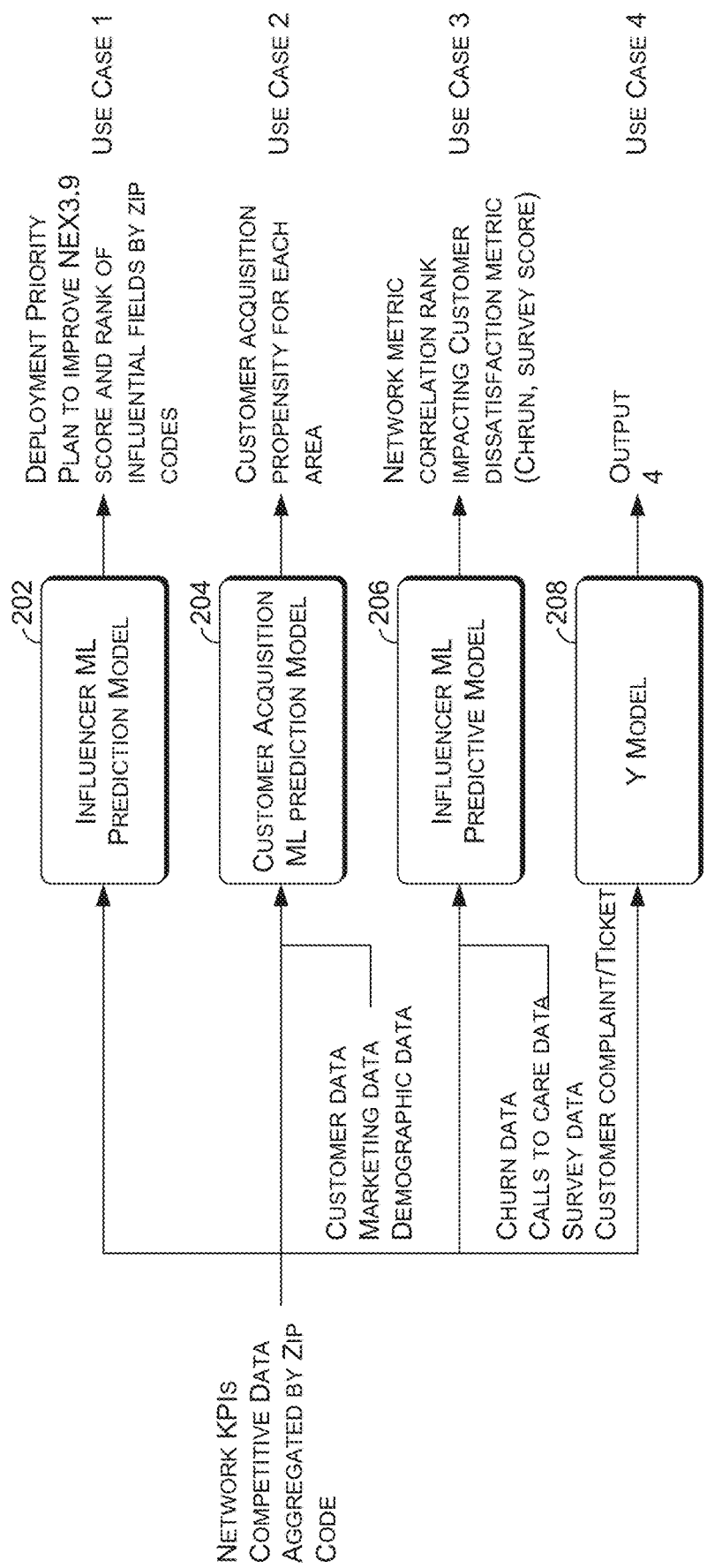
FIG. 2 depicts a block diagram of geographic area-level analysis machine learning (ML) use case scenarios in accordance with aspects herein.

One example embodiment of the system and methods described herein is depicted in the flow chart of FIG. 2, including different use cases for the network KPIs. Each of these use cases can be implemented with any of the systems described herein. Note that network KPIs can include a plurality of competitive data aggregated by geographic area and/or additionally aggregated into clusters as described herein, such that predictions can be made using ML models for each of the geographic areas or clusters to which they belong. In one embodiment, the ML model can be an influencer ML prediction model 202 that takes the network KPIs as inputs and uses these network KPIs to predict which ones of the network KPIs are most influential. For example, a most-influential one of the network KPIs might have the greatest impact on customer experience scores such as NEX3.9 scores.

In another embodiment, the ML model can be a customer acquisition ML prediction model 204 that can receive network KPIs as input, as well as additional data input such as customer data, marketing data, demographic data, or the like. The predictions made by the customer acquisition ML prediction model 204 can be predictions related to customer acquisition propensity for each cluster or geographic area associated with each cluster. Customer acquisition propensity generally refers to how likely a network is to get more customers within a given geographic area or clusters associated with a given geographic area.

In yet another embodiment, the ML model can be an influencer ML predictive model 206 that can receive KPIs as input, as well as additional data input such as churn data, calls-to-care data, customer survey data, customer complains/complaint tickets, and the like. The predictions made by the influencer ML predictive model 206 can be network metric correlation ranks impacting customer dissatisfaction metrics (e.g., churn or survey scores). Note that churn data, as referenced herein, can refer to statistics regarding customers deciding to no longer do business with a particular telecommunications network or carrier. Survey scores can refer to various types of data obtained via surveys sent to customers on a regular basis asking for opinions regarding the network and other various customer experience-related data.

In other embodiments, any ML model, such as the Y model 208 depicted in FIG. 2, can receive network KPIs for a particular geographic area (e.g. particular zip codes) or clusters associated therewith and can output any predictions associated therewith. Those predictions can assist in determining which network improvements or upgrades can provide desired network results for specific geographic areas on a desired granular level. For example, the network KPIs may include signal quality readings (e.g., Received Signal Strength Indicators (RSSI), average throughput in a given area. The output may be intelligent predictions, such as predicting signal quality or average throughput for a given area based on corresponding patterns in the KPIs via a regression model.

Figure 3:
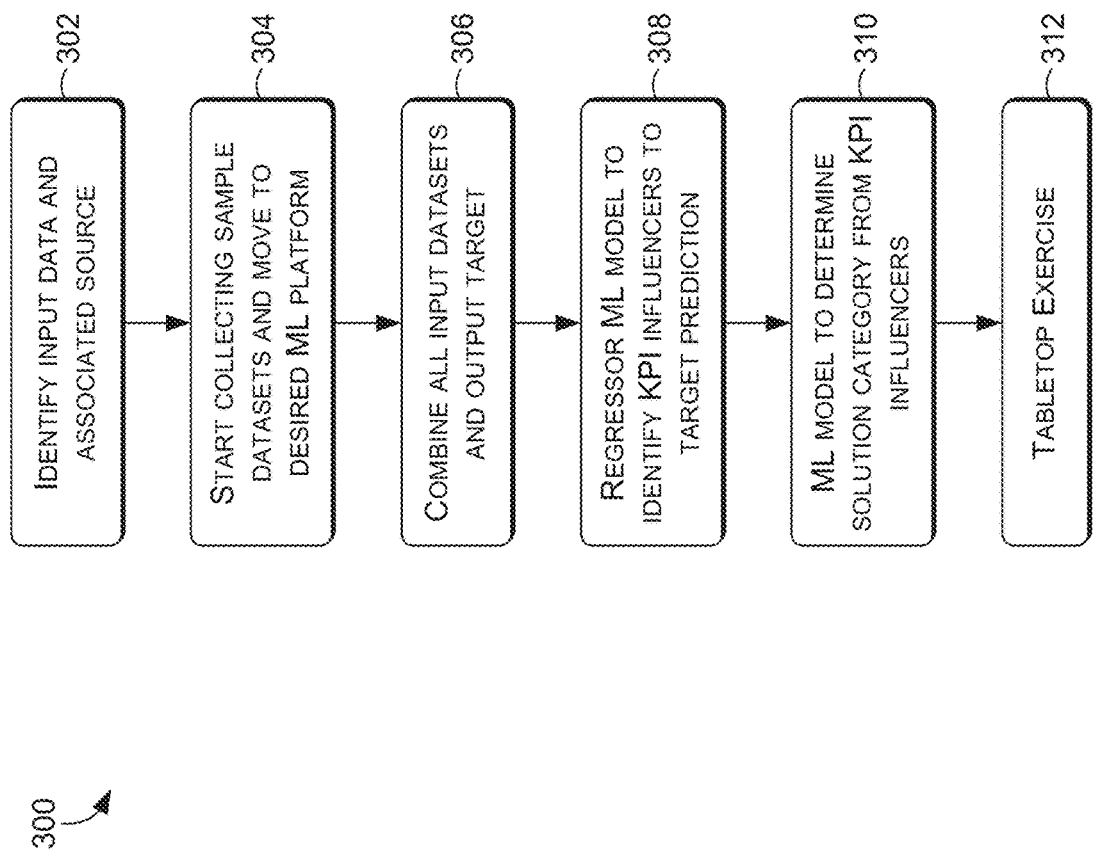
FIG. 3 depicts a block diagram of a process flow for the first use case depicted in FIG. 2, in accordance with aspects herein.

A process flow 300 of the first use case (as in FIG. 2) for given clusters or given geographic areas is depicted in FIG. 3. Specifically, the process flow 300 can include identifying input data and associated sources, as in block 302. The data or data sources can include, for example, network KPIs, cell availability, sources of Internet access performance metrics (e.g., connection data rate and latency), Nex3.9 scores (or other customer experience scores), site configuration history, deployment plans, or the like. The process flow 300 can also include collecting sample datasets and moving them to desired ML platforms, as in block 304. This collecting can be performed via various cloud storage and management systems and software known in the art, such as IBM Cloud Pak for Data (CP4D), TERADATA, Azure cloud data products, Hadoop, or the like. Quantum is the Engineering platform that is made up of Azure, Hadoop and Teradata. The Quantum Hadoop system is made up of 2 distinct platforms: A production system that contains all daily processes and full network datasets and a Quantum Exploration Platform (QEP) that is used for development and testing.

Furthermore, the process flow 300 can include combining all input datasets and output targets, as in block 306, for inputting into the influencer ML prediction model 302 (e.g., a regressor ML model) to identify KPI influencers to a target prediction, as in block 308. In some embodiments, the "regressor ML model" is a model that uses regression functionality. Regression models predict continuous valued outputs, such as numeric data instead of labels or classes (as in classification). Regression models can also identify the distribution trends based on the available or historic data. Regression models are supervised. Output targets can be, for example, a customer experience score such as a Nex3.9 score, or can include a downlink (DL) throughput, such as EPS encryption algorithm (EEA) throughput or app throughput, latency values, RSSI predicted values, and the like. The ML model's output can include, for example, weighted importance of network KPIs influential to target predictions.

In some embodiments, the process flow 300 can then use a ML model (e.g., a classifier model) to determine a solution or solution category based on the most-influential network KPIs, as depicted in block 310. For example, solution categories can include coverage expansion or capacity enhancement. In an illustrative example, the ML model can predict that coverage should be expanded to a certain class based on DL throughput readings being over a threshold. Then automated or manual steps can be taken to provide expanded coverage or capacity enhancement, depending on the solution category identified. Finally, these solutions can be re-evaluated using the same process flow 300 for a specific geographic test area, tracking target improvements following implementation of these solutions, as in block 312.

Figure 4:
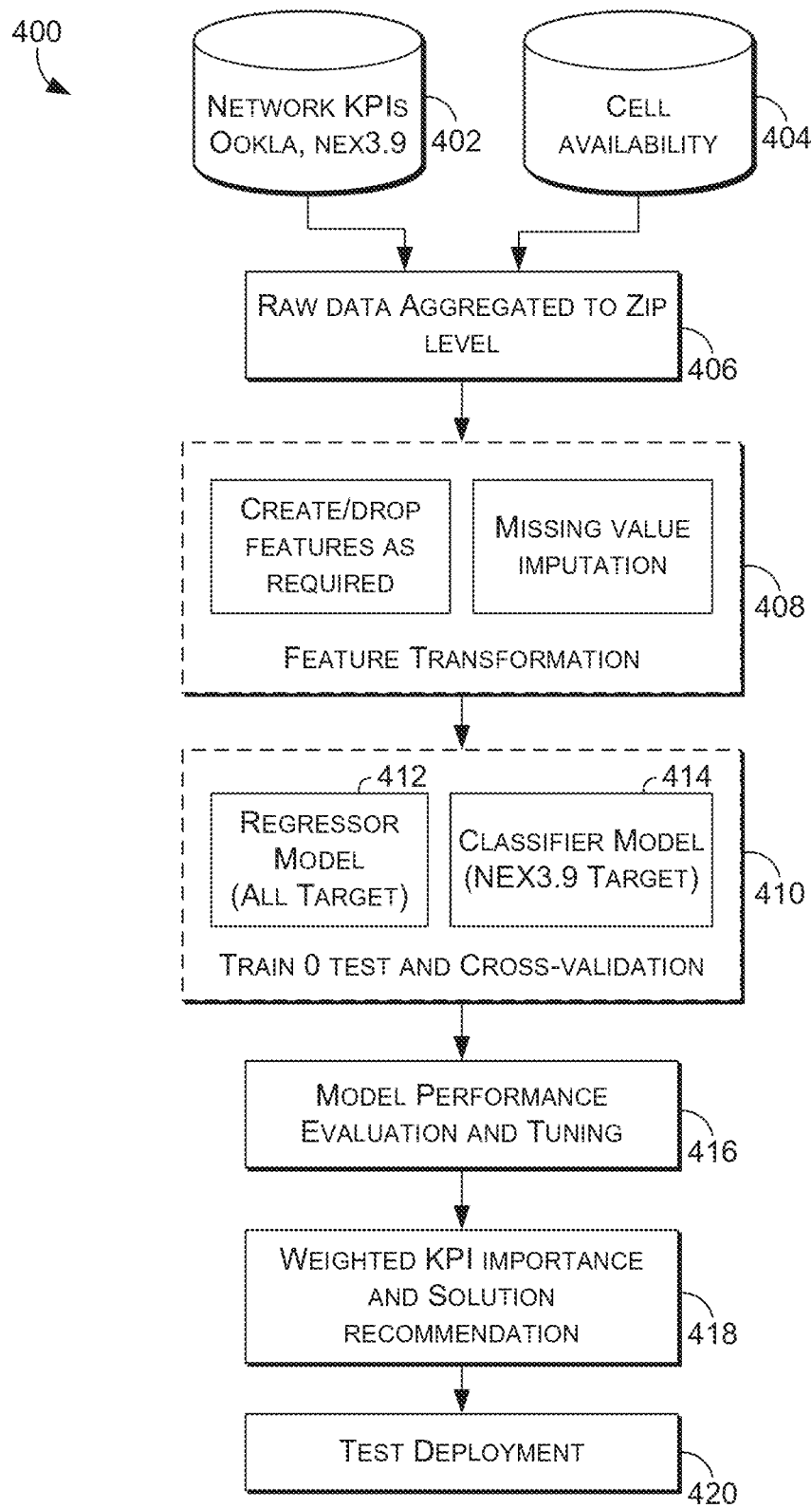
FIG. 4 depicts a block diagram of an ML model flow associated with the first use case depicted in FIG. 2, in accordance with aspects herein.

An example ML model flow 400 is depicted in FIG. 4, in accordance with some embodiments. A first source 402 and a second source 404 is depicted as providing various network KPIs, cell availability, sources of Internet access performance metrics (e.g., connection data rate and latency), Nex3.9 scores (or other customer experience scores), site configuration history, deployment plans, or the like. Then, an aggregator 406 is depicted as aggregating raw data to a specific geographic area (e.g., postal zip code level). This step can also include clustering the aggregated data, as described herein, into various clusters of data (e.g., clusters of zip code associated data for a group of zip codes with certain statistical similarities).

The ML model flow 400 can also include feature transformation 408, such as creating or dropping features as required or handling missing value imputation. Such feature transformation can include any suitable data cleaning or normalization technique. For example, in some embodiments, feature transformation 408 is indicative of machine learning pre-processing steps, such as data wrangling, data munging, scaling, and the like. Data wrangling and data munging refers to the process of transforming and mapping data from one form (e.g., "raw") into another format to make it more appropriate and useable for downstream processes (e.g., predictions). Scaling (or "feature scaling") is the process of changing number values (e.g., via normalization or standardization) so that a model can better process information. For example, particular embodiments can bind number a range of integer values from 1 through 100 to values between 0 and 1 via normalization.

The ML model flow 400 can also include training, testing, and cross-validation at block 410. This can include training, testing, and cross-validation of its ML models, such as the regressor model 412 and the classifier model 414. Training can be conducted based on past enhancements that have occurred to the network, allowing the ML models to learn therefrom. Any combination and quantity of ML models can be used for any of the targets described above. Example types of regressor models that can be used in accordance with embodiments herein include light gradient boosting model (GBM) and random forest models.

Based on the output from the training, testing, and cross-validation block 410, a model performance evaluation and tuning block 416 can tune (e.g., fine-tune) or adjust the inputs or the ML models accordingly. Furthermore, weighted KPI importance and solution recommendations can be output, as in block 418, and test deployment of those solutions can be analyzed, as in block 420. For example, this solution analysis can include implementing a solution and then running the ML model flow 400 again to determine resulting changes or improvements. Alternatively, the solution analysis can include implementing a solution and then comparing network KPIs for a particular geographic area before and after the improvements. Such comparisons can also be used to further train the ML models in some embodiments herein.

Figure 5:
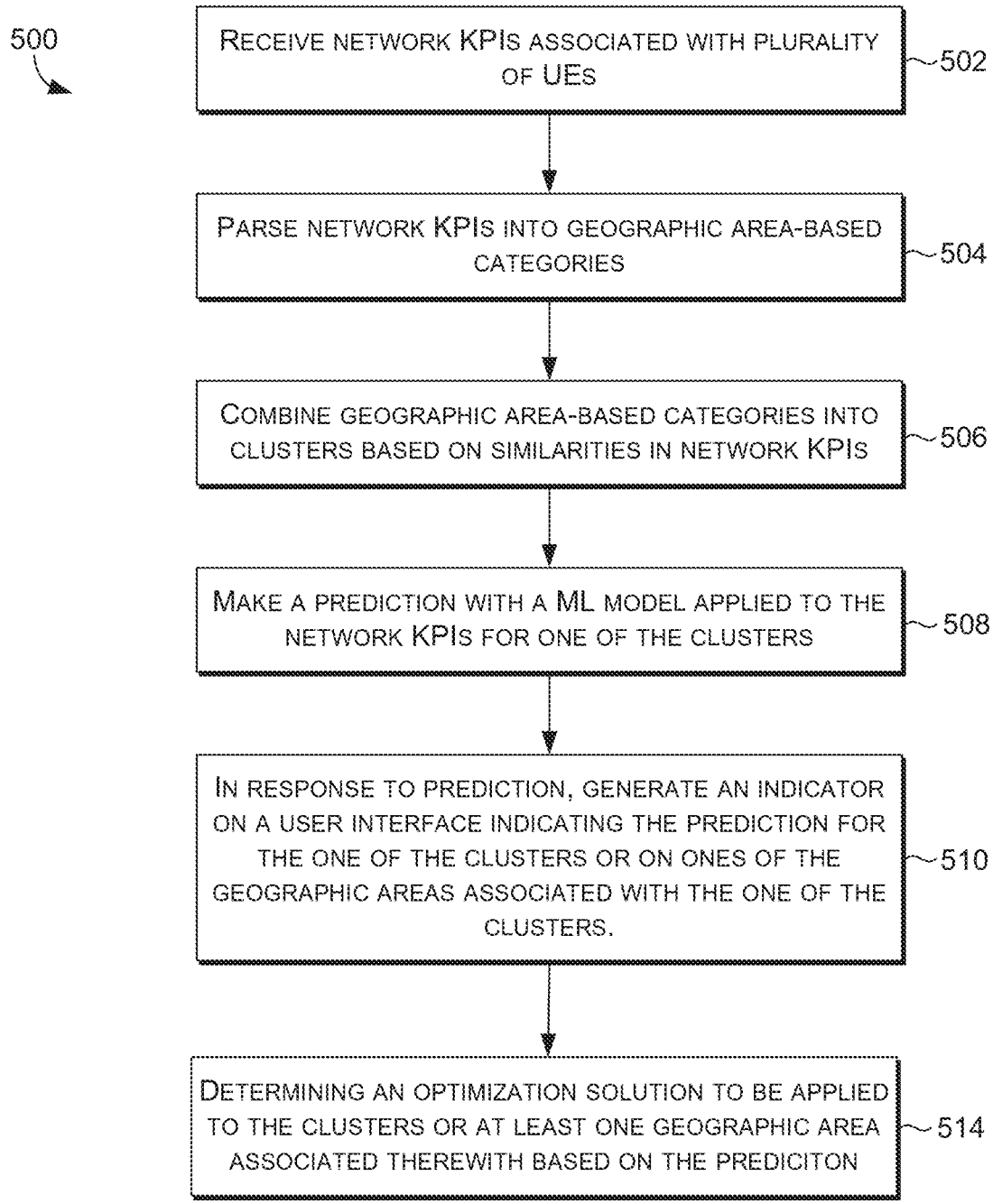
FIG. 5 depicts a flow diagrams of exemplary methods for making telecommunications network predictions in accordance with aspects herein.

As depicted in FIG. 5, a method 500 for telecommunication network predictions based on KPIs within given geographic areas can include a number of steps, which can occur in the order depicted herein or in any other order without departing from the scope of the technology herein. Furthermore, one or more steps can be added, omitted, or duplicated without departing from the scope of the technology described herein. As depicted in block 502, the method 500 can include receiving network KPIs associated with a plurality of UEs. These KPIs can be received and/or generated by the control server 102 or the computing device 800 or any other plurality of data sources. For example, the KPIs can include signal quality, latency, dropped calls, average throughput of usage, lack of coverage, how often the UEs have a signal lower than a defined threshold, and the like.

The method 500 can further include parsing the network KPIs into a plurality of geographic area-based categories, as depicted in block 504. Specifically, each one of the plurality of geographic area-based categories can correspond to network KPIs obtained by cell towers or UEs located within a given geographic area. For example, in some embodiments, the geographic area-based categories each correspond to different postal zip codes in the United States. However, other government-assigned or network-assigned geographic boundaries can be used to aggregate the network KPIs into the geographic area-based categories without departing from the scope of the technology described herein.

The method 500 can also include a step of combining the geographic area-based categories into clusters determined based on one or more similarities in the network KPIs of each of the geographic area-based categories, as depicted in block 506. For example, the similarities can include statistical similarities or other such similarities unrelated to geographic proximity. That is, instead of grouping a plurality of postal zip code regions into a larger region, the clusters can group data from postal zip codes having similar population demographics, population density, how urban or rural the areas are, geographic features of the areas that can affect signal quality (e.g., mountains versus plains), whether the areas have similar network resources, and/or the like. In some embodiments, combining the data or network KPIs for the various geographic area-based categories into clusters can include, for example, using a K-means cluster algorithm based on one or more of the network KPIs. In one example K-means algorithm used for clustering, geographic areas or zip codes are clustered by separating their network KPIs into groups of approximately equal variance. However, other clustering algorithms can be used without departing from the scope of the technology described herein.

The method 500 can also include a step of making a prediction with a ML model applied to the network KPIs for one of the clusters or one of the geographic regions, as depicted in block 508. For example, this step can include predicting a most-influential one of the network KPIs within at least one of the clusters by applying a ML model (e.g., the regressor model 308) to the network KPIs of the at least one of the clusters. In this context, a most-influential one of the network KPIs can refer to one or more of the KPIs that most influence customer experience scores (e.g., NEX3.9 scores) for the one of the clusters to which the ML model is applied and/or for the geographic areas (e.g., zip codes) associated with that cluster. Additionally or alternatively, this method step can include predicting a likelihood of customer acquisition within that cluster or the geographic areas associated therewith using one of the ML models described herein. For example, in some embodiments, the ML model is configured to predict ones of the network KPIs that most influence customer dissatisfaction metrics or customer acquisition propensity for each of the clusters or the geographic areas associated therewith.

In some embodiments, the method 500 can also include a step of tuning or training the ML model (e.g., as described with respect to FIG. 7) subsequent to the prediction at block 508. Training or tuning can include performing multiple prediction epochs or iterations (e.g., blocks 502 through 508) in order to arrive at an acceptable loss (e.g., via a loss function) relative to the ground truth, as described in more detail below. For example, this training or tuning can be accomplished using at least one of customer data, marketing data, demographic data, churn data, calls to care data, customer survey data, and customer complaint data. In some embodiments, this training or tuning is accomplished by weighting various ones of the network KPIs within each of the clusters based on which of the network KPIs are identified as being most influential within each of the clusters. Alternatively, in embodiments in which the prediction of block 508 is related to a propensity for customer acquisition or a customer dissatisfaction metric (e.g., churn statistics or survey scores), these outputs can likewise be used to train or tune the ML model for future applications thereof. In some embodiments, block 510 includes or is supplemented with Tuning the ML model by weighting ones of the network KPIs based on the prediction (e.g., as described with respect to FIG. 7). For example, particular embodiments may activate a neural network node or connection or score the corresponding KPI higher such that, given similar features, the same prediction can be made.

The method 500 can further include, in response to the predictions of step 508, generating an indicator on a user interface indicating the prediction, as depicted in block 510. This indicator can be a graphical symbol, color change, or the like on a map depicting at least one of the geographic areas associated with the cluster, for example. In some embodiments, the most-influential one of the network KPIs can be indicated in this manner. Specifically, the step of block 510 can cause an indicator to be generated at the user interface (e.g., on a display screen or other user interface), and the indicator can indicate the most-influential one of the network KPIs within at least one of the clusters.

Figure 6:
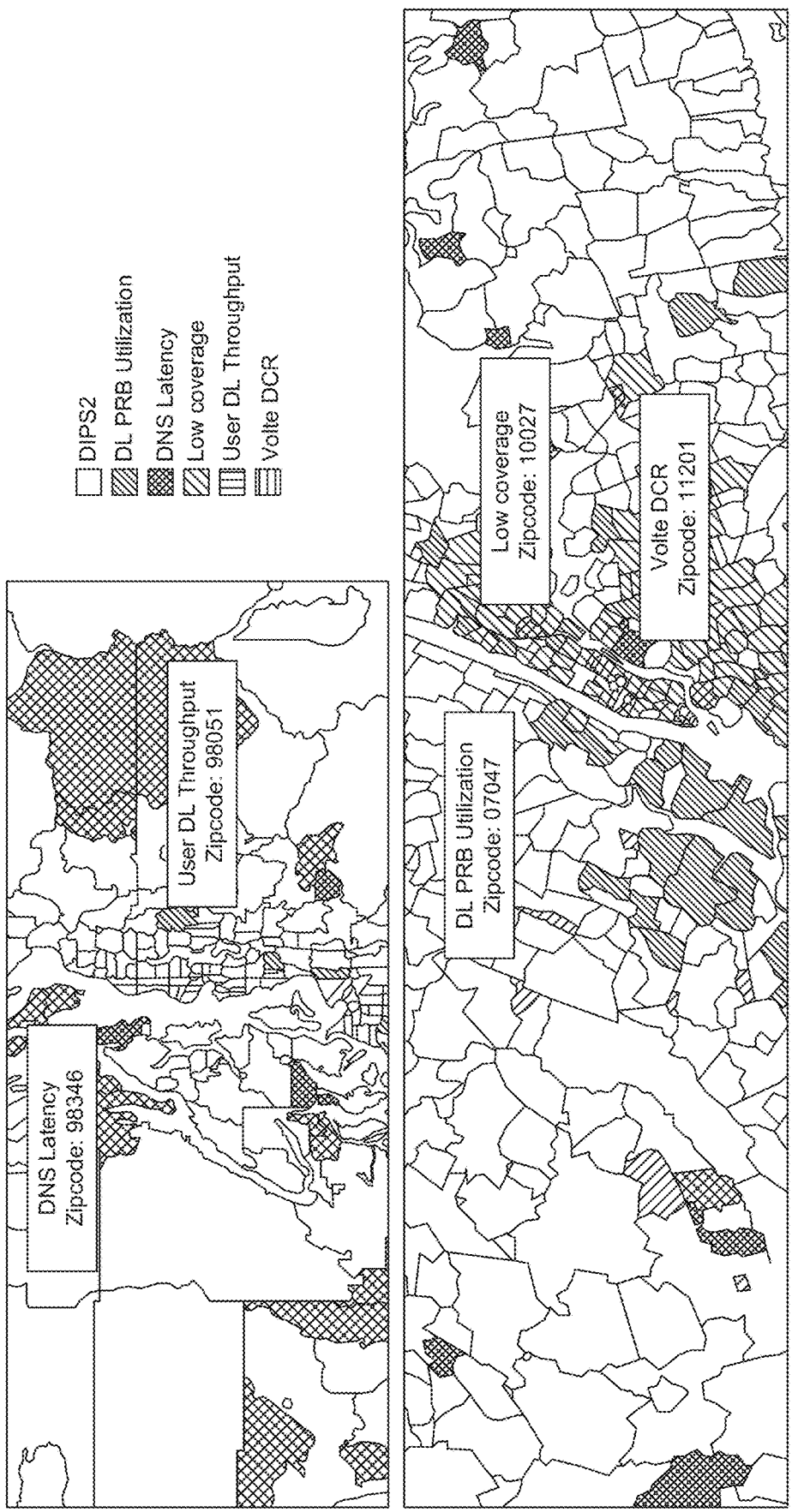
FIG. 6 is an exemplary map depicting a most-influential key performance indicator (KPI) for each of the zip codes displayed on the map, in accordance with aspects herein.

In some embodiments, the step of generating the indicator depicted in block 510 can also comprise generating a map with visual indications for each of the plurality of geographic areas depicted on the map. Specifically, the visual indications can denote (e.g., by highlighting, color-coding, text, graphical symbols, or other visual association techniques) which of the network KPIs are most influential within associated ones of the clusters to which each of the plurality of geographic areas belongs. For example, as depicted in FIG. 6, a map is generated with color-coded indications of the most-influential KPI within the borders of each of the zip codes displayed on the map. Specifically, FIG. 6 depicts zip code 98346 as having domain name system (DNS) latency as its most-influential KPI. The shading indicated by a map key to the right of the map provides for this information. Additionally or alternatively, user-selection of a specific region can result in a pop-up indicator (as displayed) stating the zip code number or identifier and/or its most-influential KPI. DNS latency is an amount of time for data to reach a particular destination and come back. So in this example, based on the visual indicator (i.e., color-coded or selectively-shaded), it can be determined which KPI (e.g., DNS latency) is most-influential to the customer experience score or the Nex3.9 score. Based on this KPI, priorities for improving the network within that specific zip code or geographic region can be set by a user or an automated system.

In some embodiments, the method 500 or any of the methods described herein can further comprise a step of determining an optimization solution to be applied to the clusters or at least one geographic area associated therewith based on the prediction, as depicted in block 514. For example, this optimization solution can be based on one of the network KPIs identified as the most influential within the at least one of the clusters, for example. This optimization solution can be generated on the user interface (e.g., user display) and/or otherwise communicated to teams for carrying out these optimization solutions. In some embodiments, the optimization solutions can be instructions generated and communicated to third parties for automated or manual implementation of said optimization solutions.

In one specific example embodiment, iterative zip code level NEX3.9 predictions can be made by modeling the impact of increasing network capacity. This provides key insights into the impact of deployed solutions to NEX3.9 scores and enables the ability to identify the criticality of additional capacity by zip code. For example, if a particular number of cell sites were added to a specific geographic area, the modeling described herein can determine the probability of particular NEX3.9 scores being achieved as a result.

In yet another example embodiment, top influential network KPIs impacting individual zip code level NEX3.9 scores are identified. In this example, zip codes are grouped utilizing k-means cluster algorithm based on network KPIs, and then these zip codes are placed into 25 clusters based on similarities from a network KPI perspective. That is, K=25 can be used in this example to place the geographic area-based or zip code-based categories into clusters. However, note that any number of clusters based on any type of geographic areas can be used without departing from the scope of the technology described herein. Furthermore, in this example embodiment, a regressor ML model can run on each of the 25 clusters to identify top ranked network KPIs influencing NEX3.9 score for each individual cluster. The result can thus give key insights of top drivers (e.g. capacity, coverage, drops) of NEX3.9 score for each zip code. This can be utilized by network teams to better understand what should be the zip code-level priority to improve the NEX3.9 score.

Figure 7:
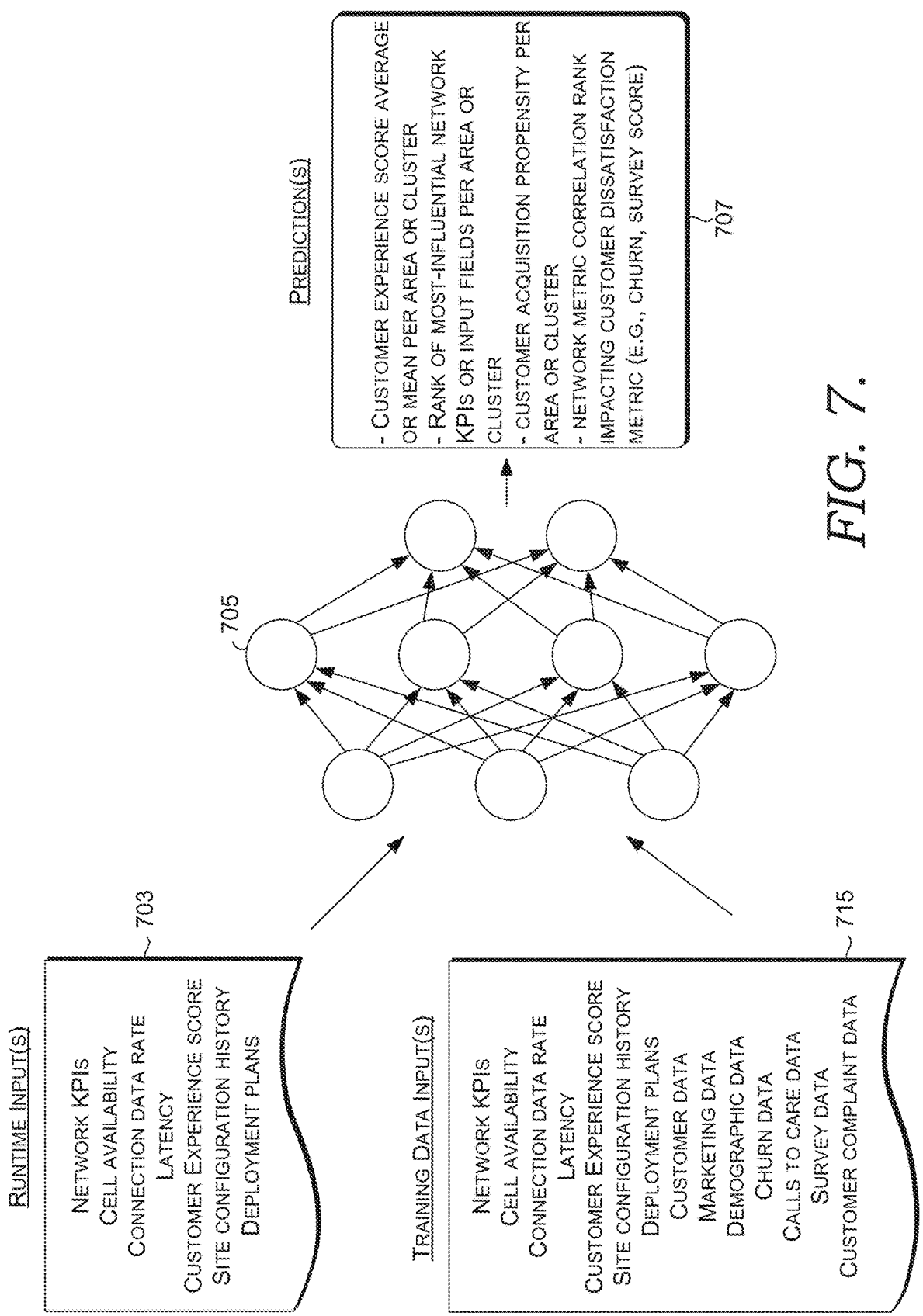
FIG. 7 is a schematic diagram illustrating how a prediction is generated using one or more machine learning models, according to some embodiments of the present invention.

FIG. 7 is a schematic diagram illustrating one or more inputs fed to a neural network (or other ML model(s)) to generate one or more predictions (e.g., customer experience scores, customer acquisition, loss of customers, and the like), in accordance with embodiments of the present disclosure. In various embodiments, the neural network 705 is trained using one or more data sets of the training data input(s) 715 in order to make training predictions (707) or inferences (707) later at deployment time via the deployment input(s) 703. In one or more embodiments, learning or training can include minimizing a loss function between the target variable (e.g., a ground truth customer satisfaction score given specific features) and the actual predicted variable (e.g., the predicted customer satisfaction given other similar features). The target variable or ground truth can be or include any suitable attribute or set of attributes, such as a ground truth customer experience scores given for the training data inputs 715, the most influential network KPIs for the training data inputs 715, whether a customer has been acquired/not acquired for the training data inputs 715, or the like. Based on the loss determined by a loss function (e.g., Mean Squared Error Loss (MSEL), cross-entropy loss, etc.), the loss function learns to reduce the error in prediction over multiple epochs or training sessions so that the neural network 705 learns which features, weights, or embeddings are indicative of the correct predictions, given the inputs. Accordingly, it may be desirable to arrive as close to 100% confidence in a particular classification or inference as possible so as to reduce the prediction error. In an illustrative example, the neural network 705 can learn over several epochs that the most influential (or prevalent) feature for a given customer experience score, is that the network latency or signal strength is over some threshold.

Subsequent to a first round/epoch of training (e.g., processing the "training data input(s)" 715 for a single iteration), the neural network 705 may make predictions 707, which may or may not be at acceptable loss function levels relative to the ground truth. For example, the neural network 705 may predict that the most influential KPI is signal quality, when it in fact dropped calls. Such prediction may thus produce an unacceptable loss. Accordingly this process may then be repeated over multiple iterations or epochs until the optimal or correct predicted value(s) is learned and/or the loss function reduces the error in prediction to acceptable levels of confidence so that the prediction is dropped calls.

In Some embodiments, the neural network 705 converts or encodes the runtime input(s) 703 and training data input(s) 715 into corresponding feature vectors in feature space (e.g., via a convolutional layer(s)). A "feature vector" (also referred to as a "vector") as described herein may include one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, pixels, and/or sentence, etc.). Such information corresponds to the set of features and are encoded or converted into corresponding feature vectors so that computers can process the corresponding extracted features. For example, embodiments can generate a feature vector that represents each feature (e.g., signal quality, latency, dropped calls, average throughput of usage, lack of coverage, how often the UEs have a signal lower than a defined threshold, and the like).

In one or more embodiments, the neural network 705 learns, via training, parameters, or weights so that similar features are closer (e.g., via Euclidian or Cosine distance) to each other in feature space by minimizing a loss via a loss function (e.g. Triplet loss or GE2E loss). Such training occurs based on one or more of the training data input(s) 715, which are fed to the neural network 705. Some embodiments can determine one or more feature vectors representing the input(s) 715 in vector space by aggregating (e.g. mean/median or dot product) the feature vector values to arrive at a particular point in feature space. For example, certain embodiments can formulate a dot product and concatenate all of the signal quality, latency, dropped calls, average throughput usage, etc. into a single vector.

In one or more embodiments, the neural network 705 learns features from the training data input(s) 715 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of training, one or more embodiments learn an embedding of feature vectors based on learning (e.g., deep learning) to detect similar features between training data input(s) 715 in feature space using distance measures, such as cosine (or Euclidian) distance. For example, the training data input 715 is converted from string or other form into a vector (e.g., a set of real numbers) where each value or set of values represents the individual features (e.g., asset features and loading area parameters) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for particular network KPIs in the training input(s) 715 and for a particular zip code, the neural network 705 can learn and predict that the most influential KPI is latency. Consequently, this pattern can be weighted (e.g., a node connection is strengthened to a value close to 1, whereas other node connections (e.g., representing other fields) are weakened to a value closer to 0). In this way, embodiments learn weights corresponding to different features such that similar features found in inputs contribute positively for predictions. In some embodiments, training is supervised using annotations or labels. Alternatively or additionally, in some embodiments, such training is not-supervised using annotations or labels but can, for example, include clustering different unknown clusters of data points (e.g., network KPIs) together. In yet other embodiments, training is semi-supervised or weak labeling.

Continuing with FIG. 7, in one or more embodiments, subsequent to the neural network 705 training, the neural network 705 (e.g., in a deployed state) receives one or more of the deployment input(s) 703. When a machine learning model is deployed, it has typically been trained, fine-tuned, tested, and packaged so that it can process data it has never processed. Responsively, in one or more embodiments, the deployment input(s) 703 are automatically converted to one or more feature vectors and mapped in the same feature space as vector(s) representing the training data input(s) 715 and/or training predictions). Responsively, one or more embodiments determine a distance (e.g., a Euclidian distance) between the one or more feature vectors and other vectors representing the training data input(s) 715 or predictions, which is used to generate one or more of the predicted inferences 707.

For example, if the deployment input(s) 703 indicate a particular zip code and KPIs, the neural network 705 may predict the most influential KPI based on training where this most influential KPI was deemed to be an acceptable prediction (e.g., within a loss threshold) for this particular input according to the ground truth. Therefore, because the neural network 705 has already learned that for a particular zip code and KPI prediction, it makes the same prediction at deployment time. In certain embodiments, the predicted inference(s) 707 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem (e.g., a new video encoder, new feedback, etc.). As illustrated by the deployment input(s) 703, the training data input(s) 715, and the predicted inferences 707, there may be any suitable combination of data and predictions to process.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, and power supply 814. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 804 includes computer-storage media in the form of volatile and/or nonvolatile memory. Memory 804 may be removable, nonremovable, or a combination thereof. Exemplary memory includes solid-state memory, hard drives, optical-disc drives, etc. Computing device 800 includes one or more processors 806 that read data from various entities such as bus 802, memory 804 or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A computer-implemented method comprising:
   receiving network key performance indicators (KPIs) associated with a plurality of user equipment (UEs);
   parsing the network KPIs into a plurality of geographic area-based categories, wherein each one of the plurality of geographic area-based categories corresponds to network KPIs obtained by cell towers or UEs located within a given geographic area;
   combining the geographic area-based categories into clusters determined based on one or more similarities in the network KPIs of each of the geographic area-based categories;
   predicting a most-influential one of the network KPIs within at least one of the clusters by applying a machine learning (ML) model to the network KPIs of the at least one of the clusters; and
   in response to the predicting of the most-influential one of the network KPIs, causing an indicator to be generated at a user interface, the indicator indicating the most-influential one of the network KPIs within the at least one of the clusters.

2. The method of claim 1, wherein the ML model is configured to predict ones of the network KPIs that most influence NEX3.9 scores for each of the clusters.

3. The method of claim 1, wherein the combining the geographic area-based categories into clusters includes using a K-means cluster algorithm based on one or more of the network KPIs.

4. The method of claim 1, further comprising training the ML model using at least one of customer data, marketing data, demographic data, churn data, calls to care data, survey data, and customer complaint data.

5. The method of claim 1, further comprising weighting various ones of the network KPIs within each of the clusters based on which of the network KPIs are identified as being most influential within each of the clusters.

6. The method of claim 5, further comprising tuning the ML model based on the weighting of the various ones of the network KPIs.

7. The method of claim 1, wherein the ML model is configured to predict ones of the network KPIs that most influence customer dissatisfaction metrics or customer acquisition propensity for each of the clusters.

8. The method of claim 1, further comprising generating a map with visual indications for each of a plurality of geographic areas depicted on the map, wherein the visual indications denote which of the network KPIs are most influential within associated ones of the clusters to which each of the plurality of geographic areas belongs.

9. The method of claim 1, wherein the network KPIs include one or more of signal quality, latency, dropped calls, average throughput of usage, lack of coverage, how often the UEs have a signal lower than a defined threshold, percentage of low coverage, home coverage signal strength, latency, leakage, DIPs, and voice drops.

10. The method of claim 1, further comprising determining an optimization solution for the at least one of the clusters based on a one of the network KPIs identified as most influential within the at least one of the clusters; and generating the optimization solution on the user interface.

11. A system for optimizing a telecommunications network within one or more geographic areas, the system comprising:
   one or more processors; and
   one or more computer storage media storing computer-useable instructions that, when used by the one or more processors, cause the one or more processors to perform a method, the method comprising:
      receiving network key performance indicators (KPIs) related to a plurality of user equipment (UEs);
      parsing the network KPIs into a plurality of geographic area-based categories, wherein each one of the plurality of geographic area-based categories corresponds to network KPIs obtained by cell towers or UEs located within a given geographic area;
      combining geographic area-based categories into clusters determined based on one or more similarities in the network KPIs of each of the geographic area-based categories;
      predicting a most-influential one of the network KPIs within at least one of the clusters by applying a machine learning (ML) model to the network KPIs of the at least one of the clusters; and
      in response to the predicting of the most-influential one of the network KPIs, causing an indicator to be generated on a user interface, the indicator indicating the most-influential one of the network KPIs within the at least one of the clusters.

12. The system of claim 11, wherein the ML model is configured to predict ones of the network KPIs that most influence NEX3.9 scores for each of the clusters.

13. The system of claim 11, wherein the combining the geographic area-based categories into the clusters includes using a K-means cluster algorithm based on one or more of the network KPIs.

14. The system of claim 11, the method further comprising tuning the ML model based on weighting various ones of the network KPIs within each of the clusters based on which of the network KPIs are predicted as being most influential within each of the clusters.

15. The system of claim 11, wherein the ML model is configured to predict ones of the network KPIs that most influence customer dissatisfaction metrics or customer acquisition propensity for each of the clusters.

16. The system of claim 11, wherein the indicator is a visual indication on a map generated on the user interface, wherein the visual indication on the map is visually associated with each of a plurality of geographic areas displayed that are associated with the at least one of the clusters.

17. The system of claim 11, wherein the network KPIs include one or more of signal quality, latency, dropped calls, average throughput of usage, lack of coverage, how often the UEs have a signal lower than a defined threshold, percentage of low coverage, home coverage signal strength, latency, leakage, DIPs, and voice drops.

18. One or more computer storage media devices having computer-executable instructions embodied thereon that, when executed, by one or more processors, cause the one or more processors to perform a method, the method comprising:
- receiving network key performance indicators (KPIs) related to a plurality of user equipment (UEs);
- parsing the network KPIs into a plurality of geographic area-based categories, wherein each one of the plurality of geographic area-based categories corresponds to network KPIs obtained by cell towers or UEs located within a given geographic area;
- combining geographic area-based categories into clusters determined based on one or more similarities in the network KPIs of each of the geographic area-based categories;
- making a prediction based on the network KPIs within at least one of the clusters by applying a machine learning (ML) model to the network KPIs of the at least one of the clusters; and
- in response to the prediction, causing an indicator to be generated on a user interface, the indicator indicating the prediction within the at least one of the clusters.

19. The one or more computer storage media devices of claim 18, wherein the prediction includes predicting a likelihood of customer acquisition.

20. The one or more computer storage media devices of claim 18, wherein the prediction includes predicting a most-influential one of the network KPIs that most influence customer experience scores for each of the clusters.

* * * * *